United States Patent
Hobbs et al.

(10) Patent No.: US 6,497,146 B1
(45) Date of Patent: Dec. 24, 2002

(54) INERTIAL RATE SENSOR AND METHOD WITH BUILT-IN TESTING

(75) Inventors: Larry P. Hobbs, Brentwood, CA (US); Pradeep Bhardwaj, Livermore, CA (US)

(73) Assignee: BEI Technologies, Inc., San Francisco, CA (US)

(*) Notice: Subject to any disclaimer, the term of this patent is extended or adjusted under 35 U.S.C. 154(b) by 52 days.

(21) Appl. No.: 09/663,740

(22) Filed: Sep. 15, 2000

(51) Int. Cl.[7] .............................. G01P 21/00
(52) U.S. Cl. .................. 73/504.12; 73/1.38
(58) Field of Search .................. 73/1.38, 1.39, 73/1.37, 1.77, 504.12, 504.13, 504.14, 504.15, 504.16, 504.02, 504.04

(56) References Cited

U.S. PATENT DOCUMENTS

| | | | |
|---|---|---|---|
| 5,426,970 A | 6/1995 | Florida et al. ............... 73/1 D |
| 5,652,374 A * | 7/1997 | Chia et al. ................... 73/1.38 |
| 5,805,466 A | 9/1998 | Roeckner et al. | |
| 5,889,193 A * | 3/1999 | Pfaff et al. ................... 73/1.37 |
| 5,900,529 A * | 5/1999 | Hanisko et al. .............. 73/1.38 |
| 5,942,686 A | 8/1999 | Bhardwaj ................ 73/504.16 |

* cited by examiner

*Primary Examiner*—Helen Kwok
(74) *Attorney, Agent, or Firm*—Edward S. Wright

(57) ABSTRACT

Inertial rate sensor and method in which in which a single output terminal is utilized for delivering a rate output signal during normal operation, interfacing with an external computer during a programming mode, and for providing a warning in the event of a failure. Access to the programming mode is permitted only when a predetermined sequence of conditions is met, and accidental initiation of the programming mode is virtually impossible. Compensation data is stored redundantly at two locations in an internal memory, and the data is read from both locations and compared to verify its validity. Signals are monitored at different points to detect the occurrence of failures.

26 Claims, 11 Drawing Sheets

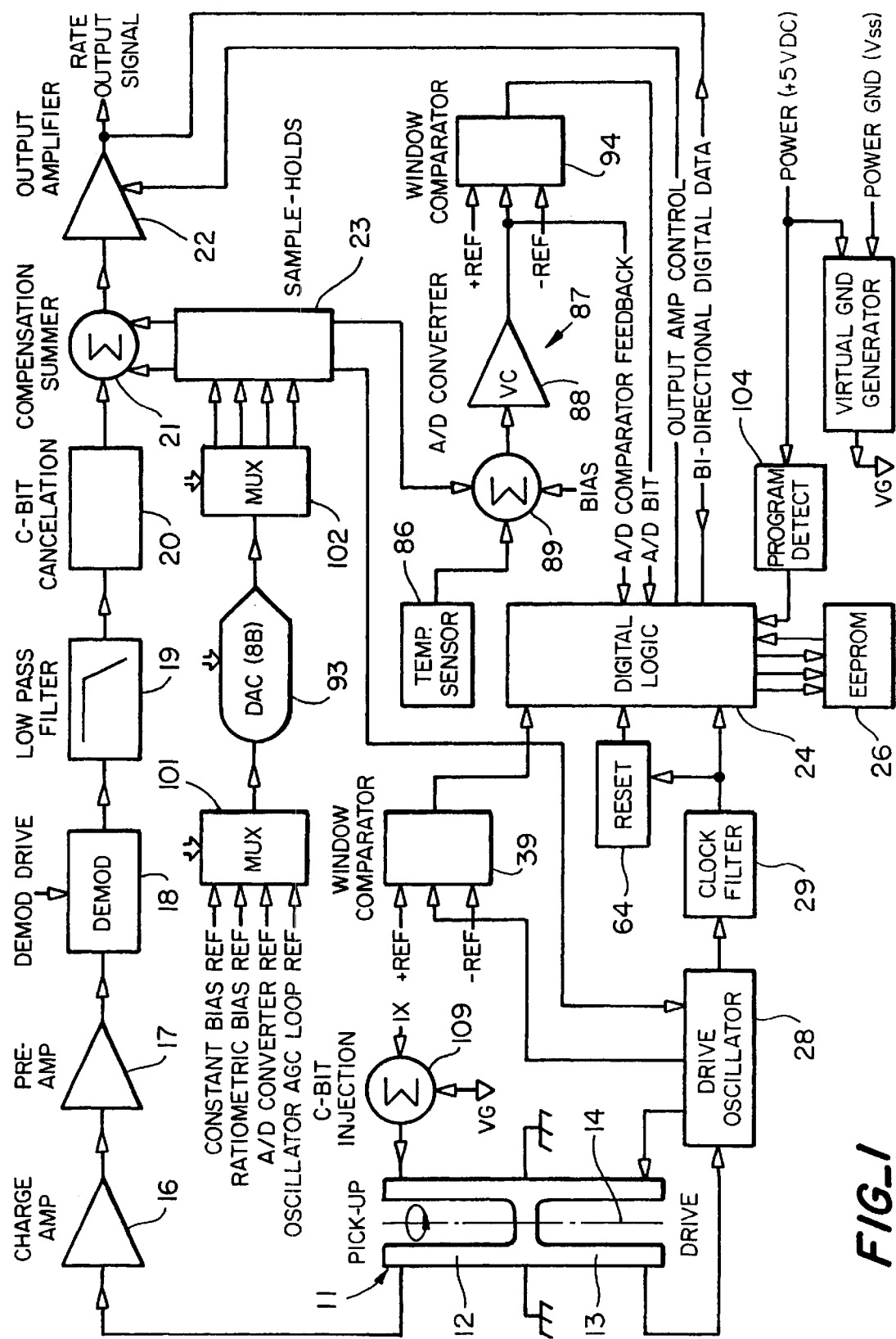
FIG_1

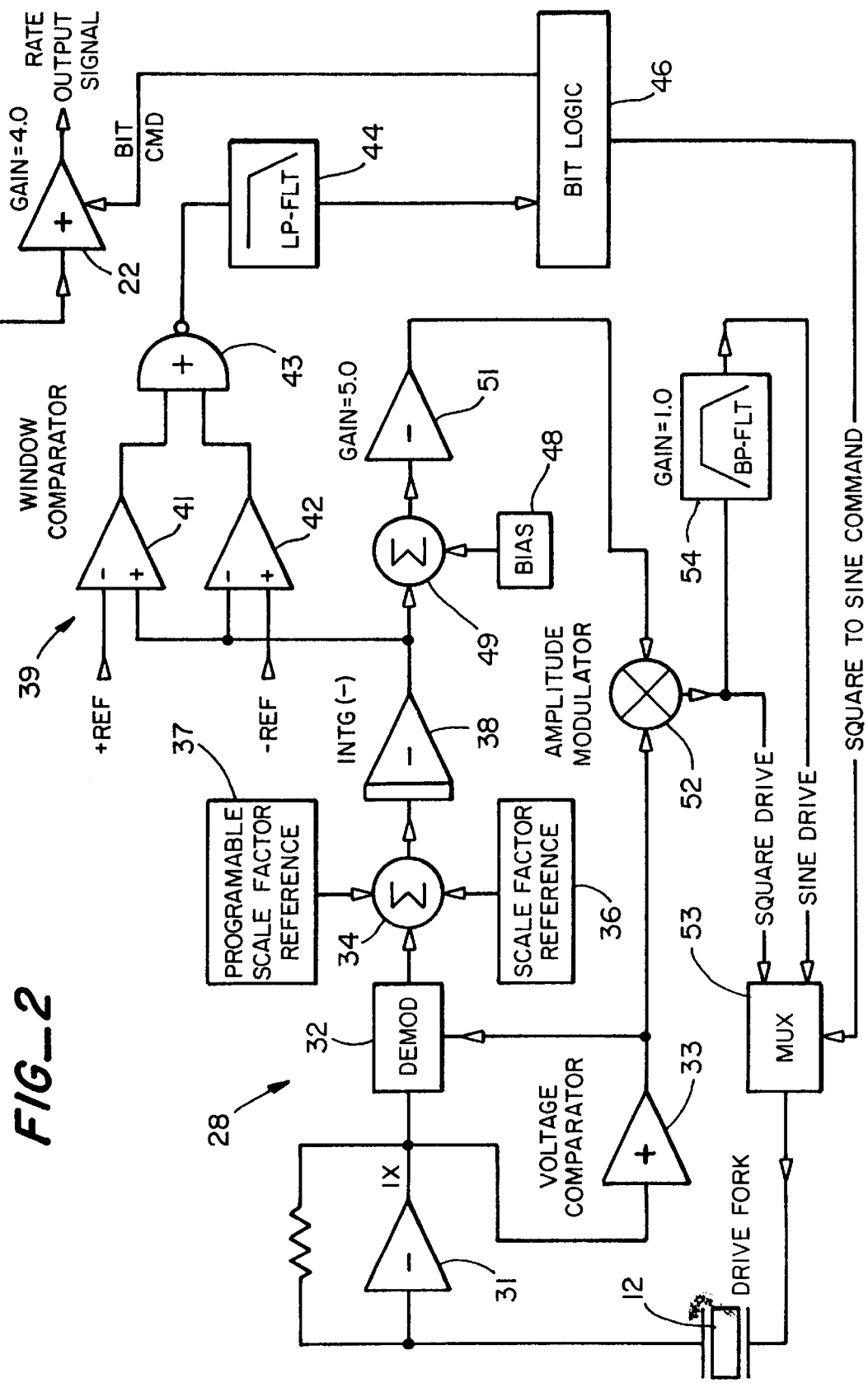
FIG_2

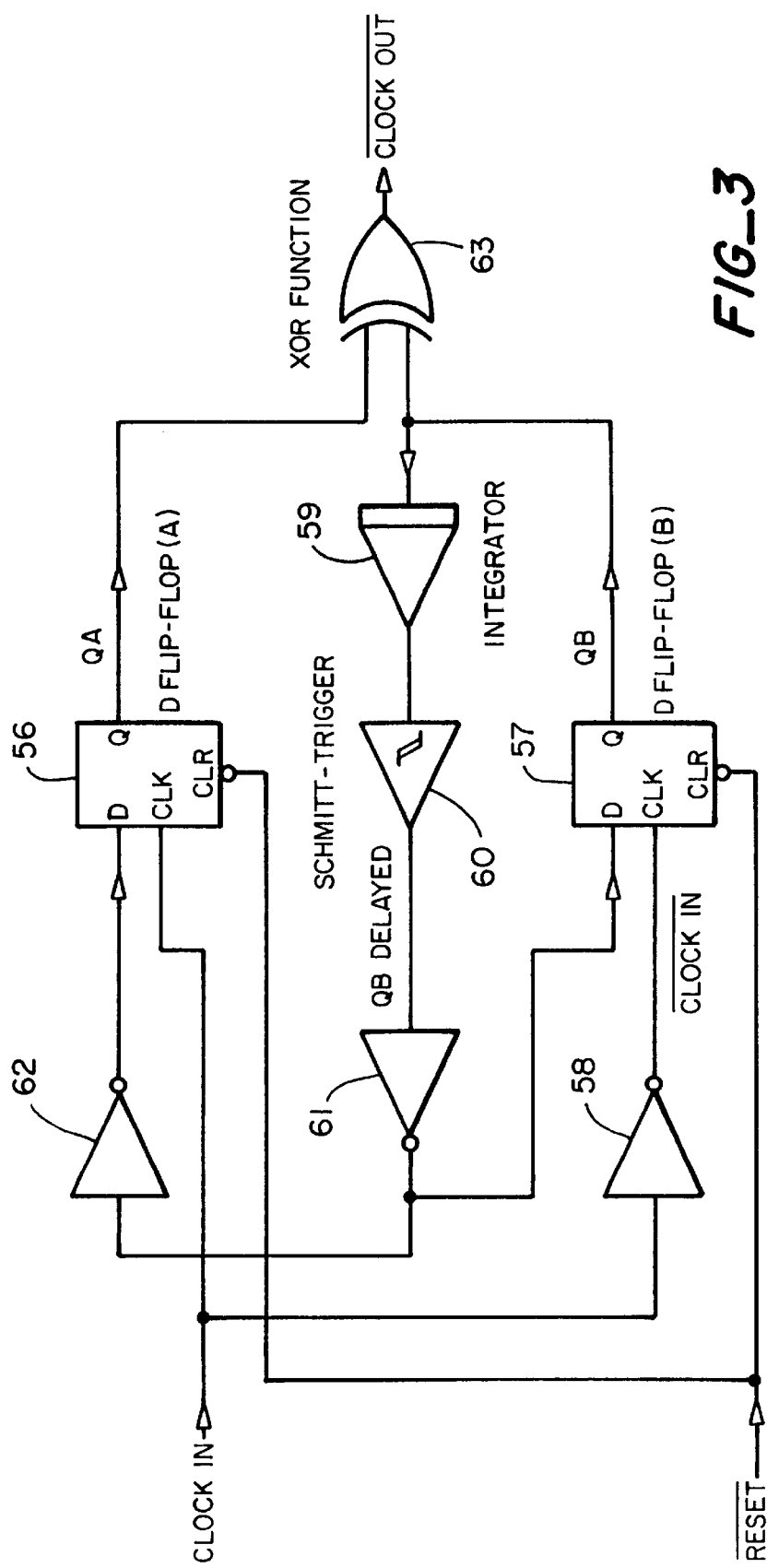
FIG_3

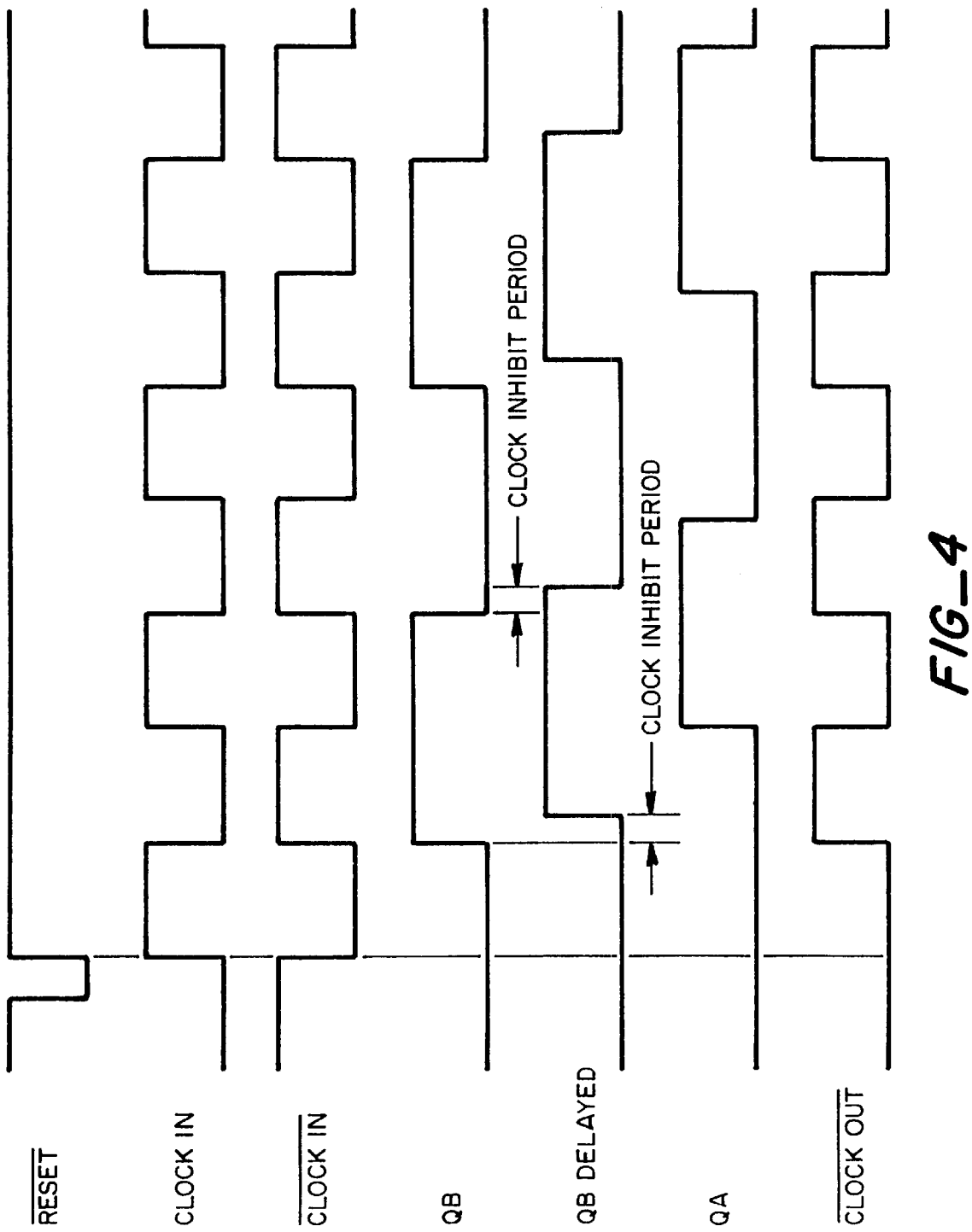
FIG_4

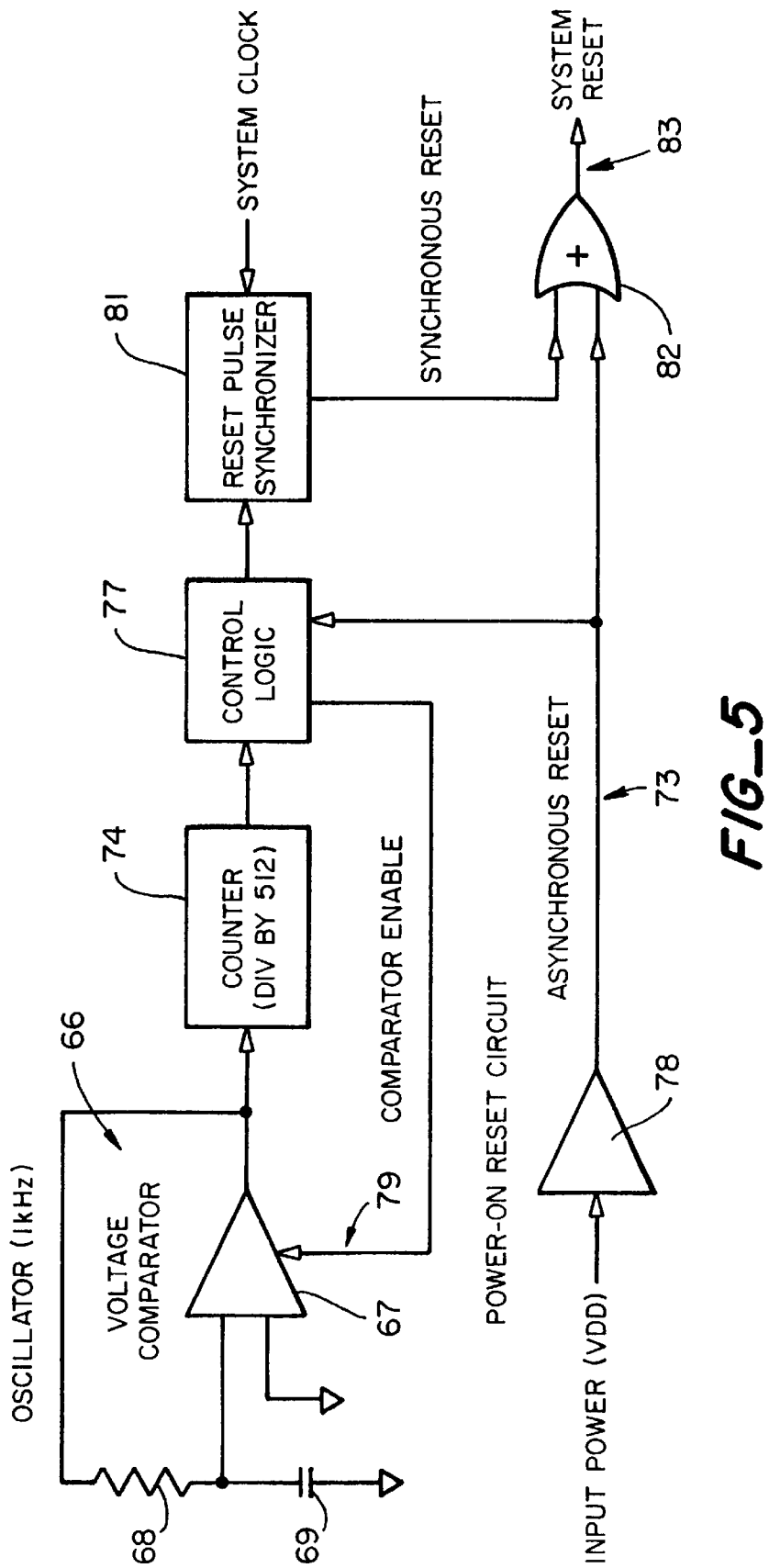
FIG_5

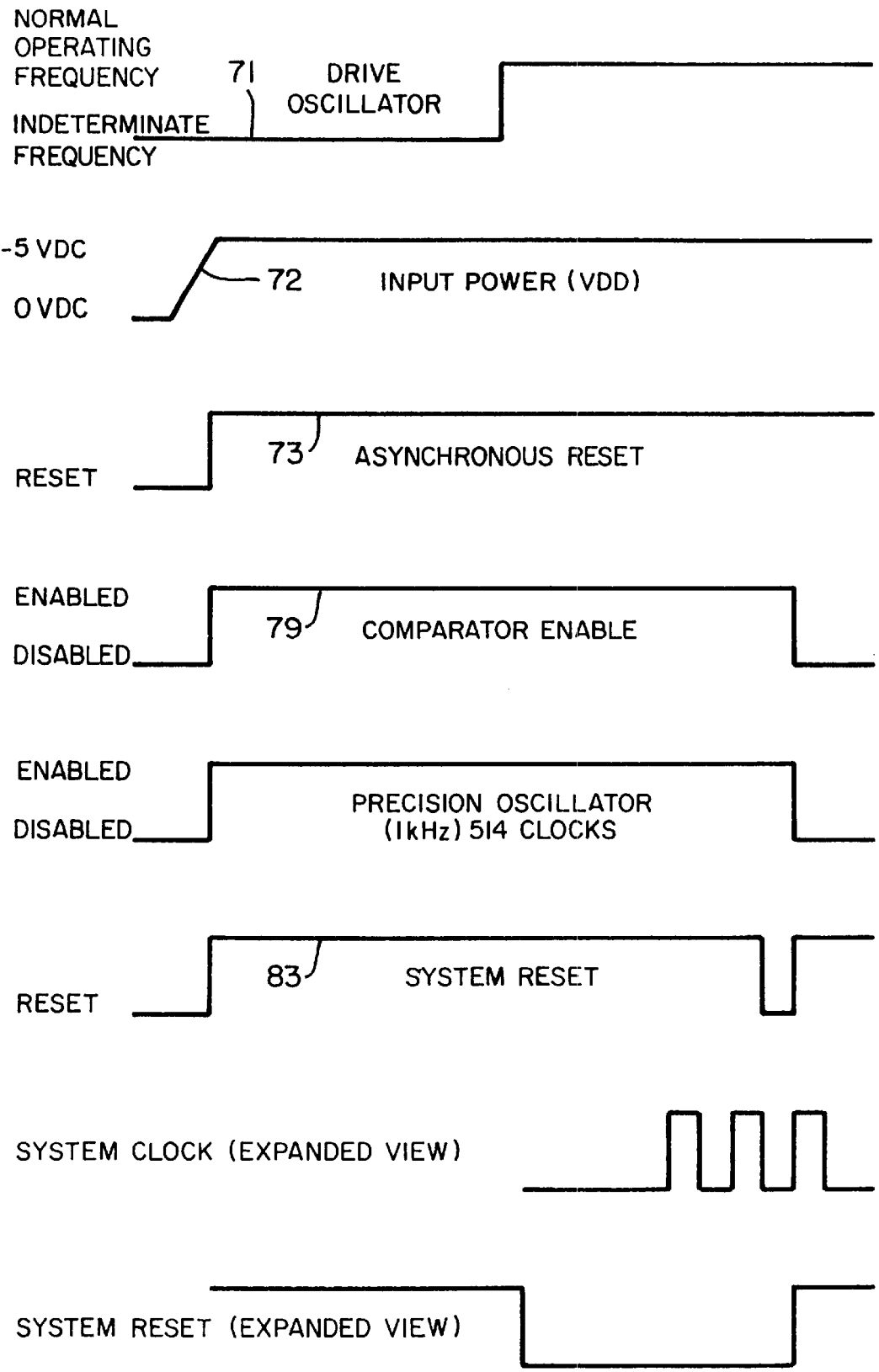
FIG_6

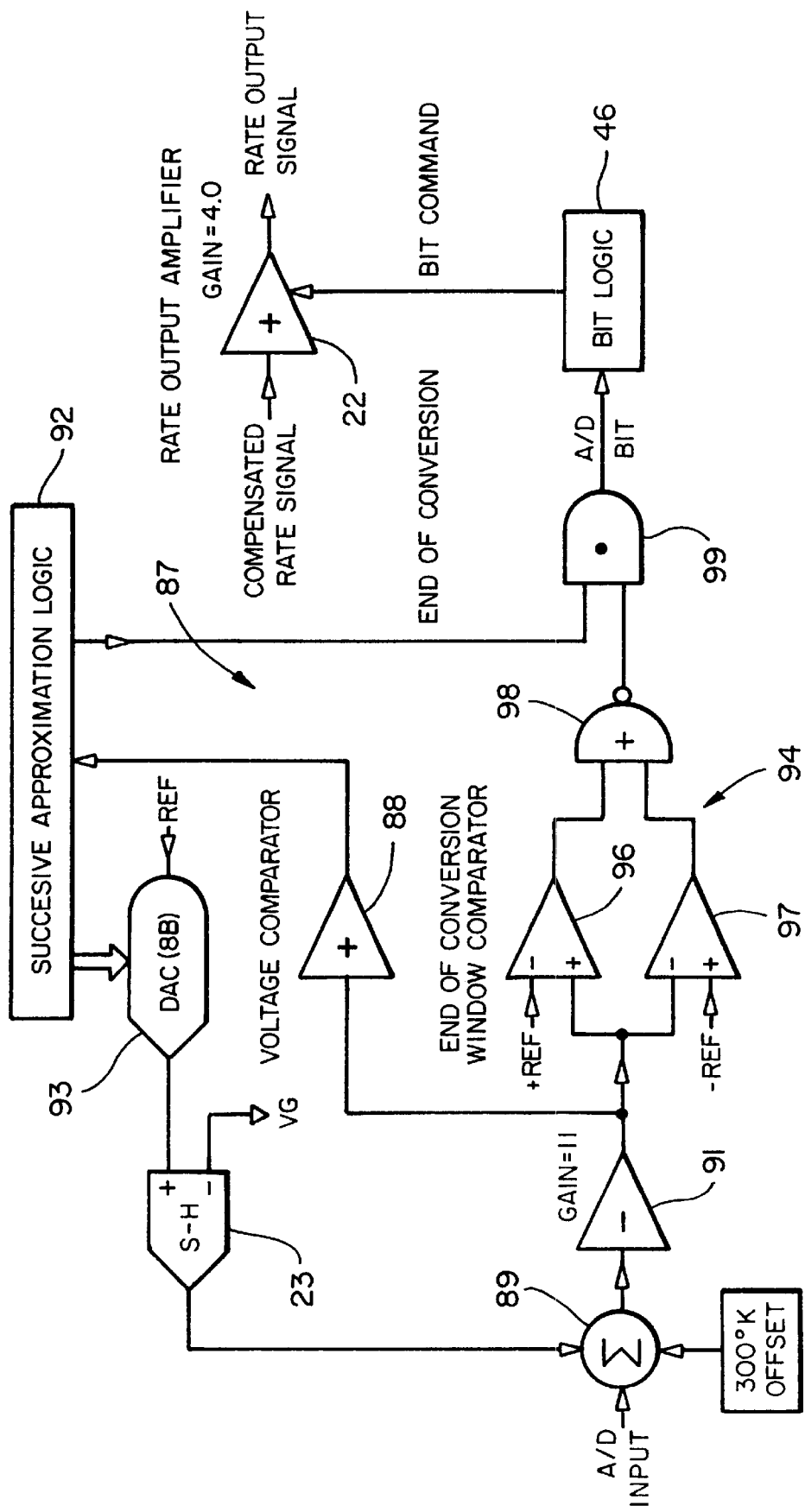
FIG_7

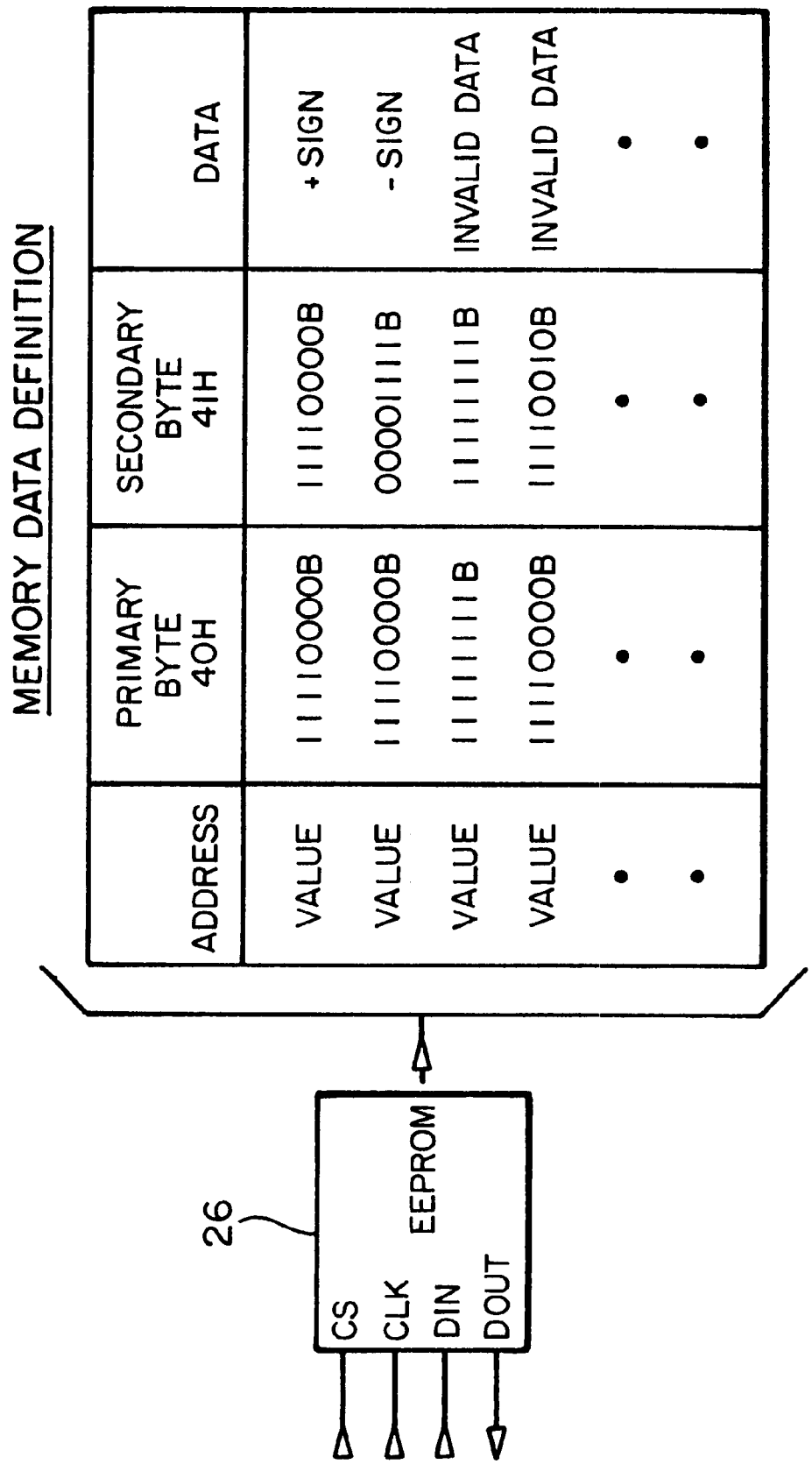
FIG_8

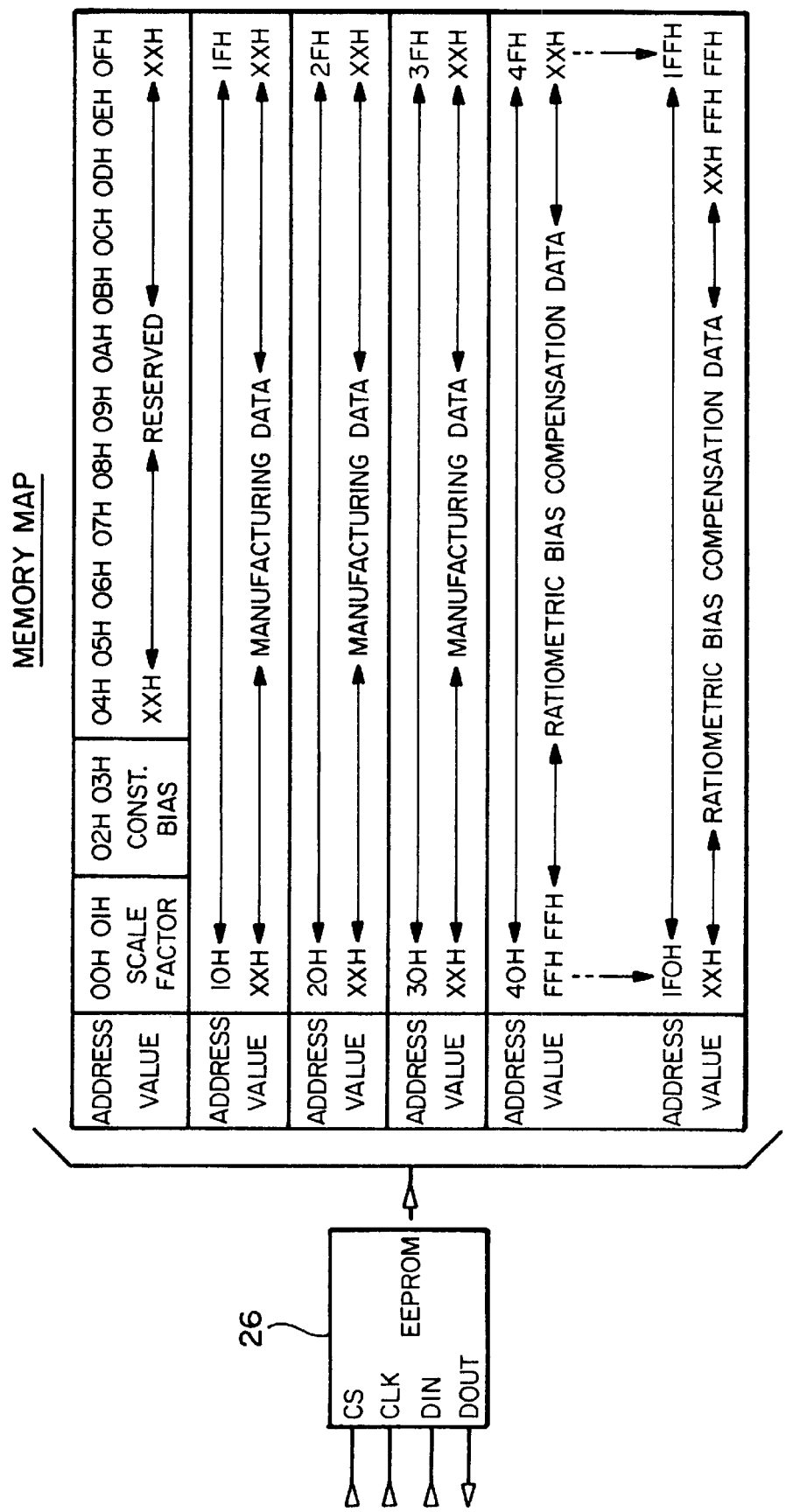
FIG_9

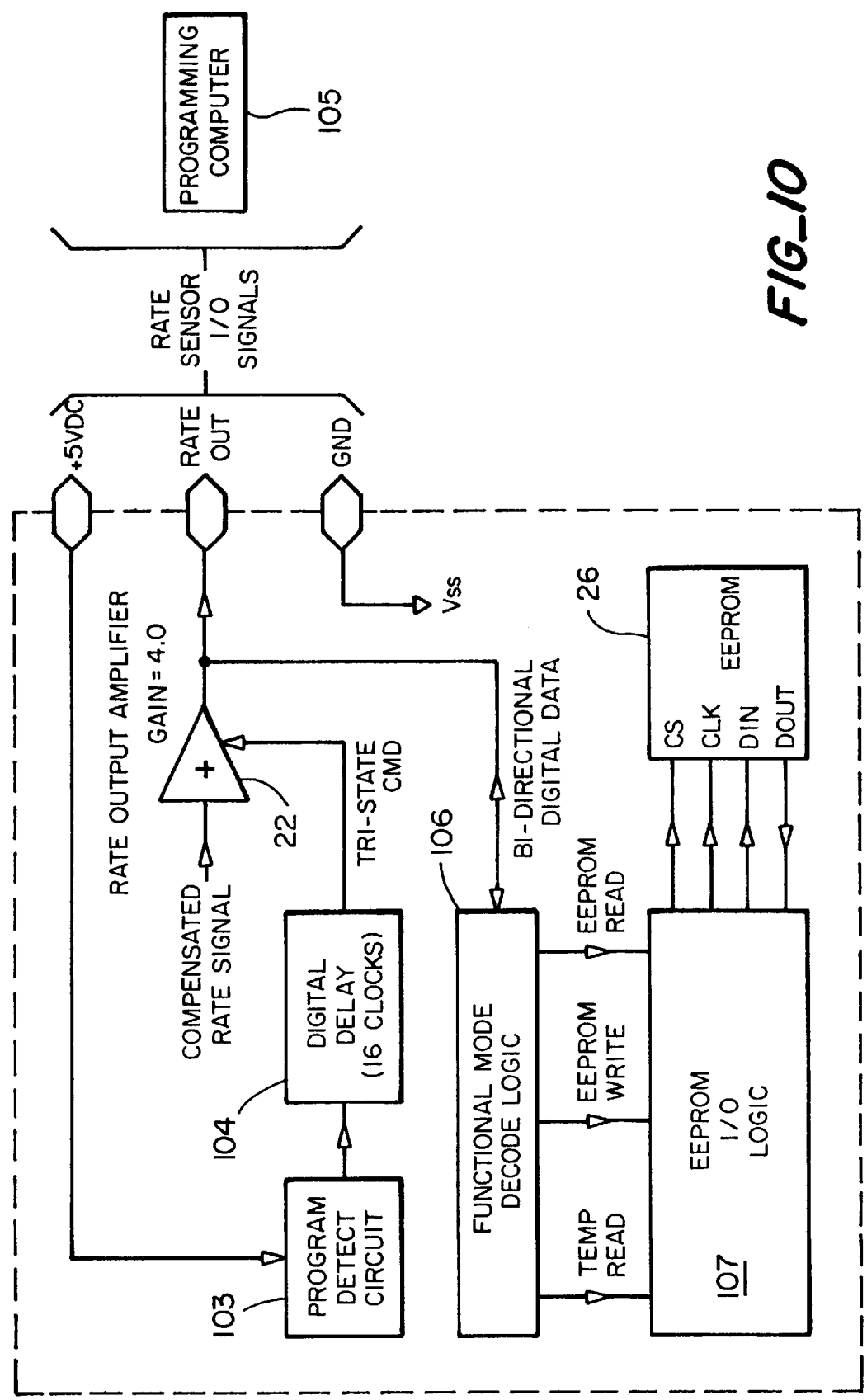
FIG_10

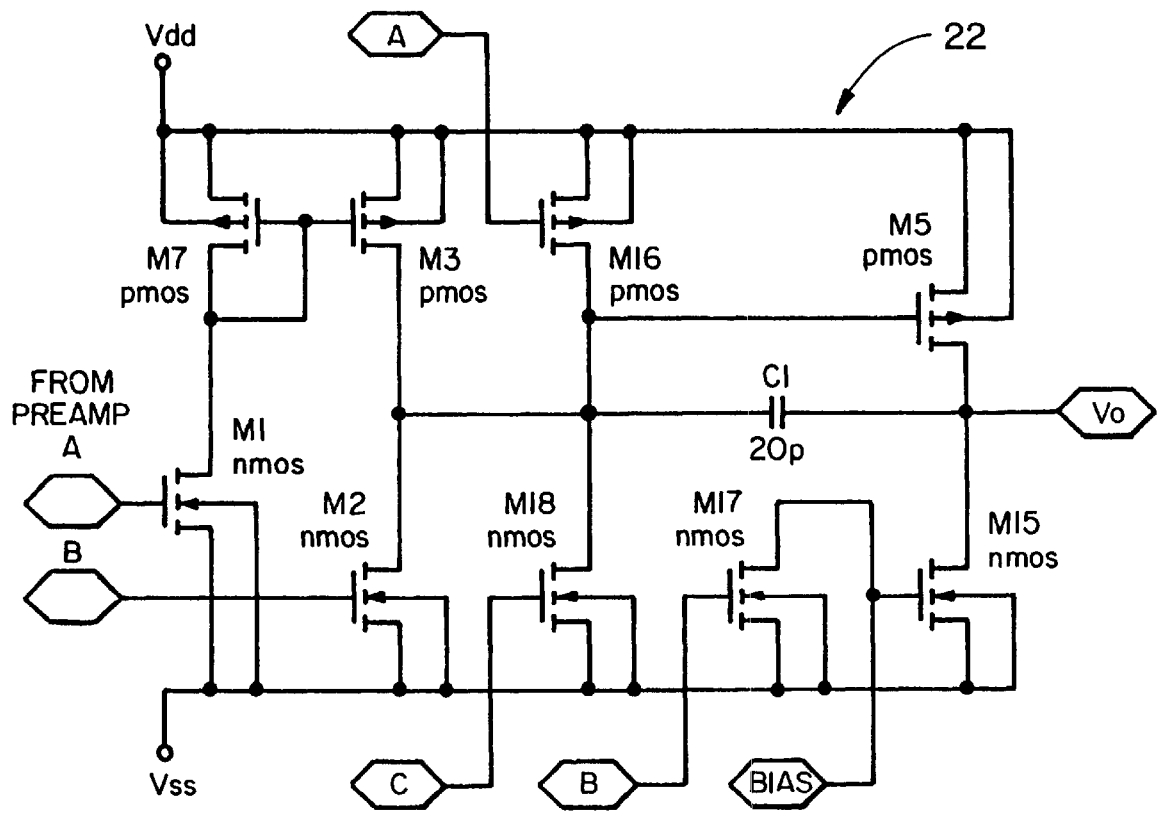
FIG_11
TRUTH TABLE
| FUNCTION | CONT. INPUT | | |
|---|---|---|---|
| | A | B | C |
| NORMAL | 1 | 0 | 0 |
| TRI-STATE | 0 | 1 | 0 |
| BIT MODE | 1 | 1 | 1 |
| 0 = Vss | 1 = Vdd | | |
FIG_12

INERTIAL RATE SENSOR AND METHOD WITH BUILT-IN TESTING

BACKGROUND OF THE INVENTION

1. Field of Invention

This invention pertains generally to inertial rate sensors and, more particularly, to an inertial rate sensor and method with built-in testing.

2. Related Art

Inertial rate sensors are used in a wide variety of applications including aircraft navigation, the guidance of missiles and spacecraft, and automotive stability control systems. In many of these applications, safety is critical, and measures must be taken to guard against failures of the sensor.

OBJECTS AND SUMMARY OF THE INVENTION

It is in general an object of the invention to provide a new and improved inertial rate sensor and method.

Another object of the invention is to provide an inertial rate sensor and method with improved built-in testing.

These and other objects are achieved in accordance with the invention by providing an inertial rate sensor and method in which a single output terminal is utilized for delivering a rate output signal during normal operation, interfacing with an external computer during a programming mode, and for providing a warning in the event of a failure. Access to the programming mode is permitted only when a predetermined sequence of conditions is met, and accidental initiation of the programming mode is virtually impossible. Compensation data is stored redundantly at two locations in an internal memory, and the data is read from both locations and compared to verify its validity. Signals are monitored at different points to detect the occurrence of failures.

BRIEF DESCRIPTION OF THE DRAWINGS

FIG. 1 is a block diagram of one embodiment of an inertial rate sensor incorporating the invention.

FIG. 2 is block diagram of the drive oscillator in the embodiment of FIG. 1.

FIG. 3 is a block diagram of the clock filter in the embodiment of FIG. 1.

FIG. 4 is a timing diagram illustrating the waveforms at different points in the clock filter of FIG. 3.

FIG. 5 is a block diagram of the reset circuit in the embodiment of FIG. 1.

FIG. 6 is a timing diagram illustrating the waveforms at different points in the reset circuit of FIG. 5.

FIG. 7 is a block diagram of an analog-to-digital converter in the embodiment of FIG. 1.

FIG. 8 is a memory definition table for the EEPROM in the embodiment of FIG. 1.

FIG. 9 is a memory map showing one possible allocation of memory locations within the EEPROM.

FIG. 10 is a block diagram illustrating the manner in which the EEPROM is programmed.

FIG. 11 is a circuit diagram of a portion of the output amplifier in the embodiment of FIG. 1.

FIG. 12 is a truth table for the output amplifier of FIG. 11.

DETAILED DESCRIPTION

As illustrated in FIG. 1, the rate sensor includes a quartz sensing element 11 in the form of a double-ended tuning fork. This tuning fork is fabricated of single crystal quartz material, and has an H-shaped configuration, with drive tines 12 at one end and pick-up tines 13 at the other. Each pair of tines is disposed symmetrically about the longitudinal axis 14 of the tuning fork.

The drive tines are driven to oscillate at the natural frequency of the tuning fork and in the plane of the tuning fork. When the tuning fork is subjected to rotation about its longitudinal axis, the Coriolis force causes the tines to deflect out of the plane of the fork, stimulating the pickup mode of oscillation. The drive and pickup signals are coupled to the tines in a conventional manner by the use of electrodes (not shown), with the drive signals stimulating piezoelectric vibration of the tines and the pickup signals being in the form of electric charge generated piezoelectrically in response to strain produced by the Coriolis force.

Although the sensing element is illustrated as being a double ended tuning fork, another type of vibratory sensing element, including a single ended tuning fork, can also be utilized, if desired.

The pickup signals pass through a charge amplifier 16, to a preamplifier 17, and then to a demodulator 18. The signals from the demodulator pass through a low pass filter 19 and a bias cancellation circuit 20 to a compensation summer 21 and then to an output amplifier 22, with the rate output signal appearing at the output of the output amplifier. With voltage inputs of +5 volts and 0 volts, the rate output is biased to +2.5 volts for zero input and swings to a more positive voltage for positive rate inputs and toward zero volts for a negative rate input. The +2.5 volt level is referred to as virtual ground.

Compensation signals are applied to the summer from sample and hold circuits 23 to adjust the output signal for factors such as temperature and to make the system ratiometric so that the scale factor of the unit varies in direct proportion to the applied power, as described in U.S. Pat. No. 5,942,686.

The system includes digital logic 24 which operates in conjunction with an external EEPROM 26 whereby the unit can be calibrated electronically without the need for handsoldered components. The digital logic also provides a built-in test function for detecting the occurrence of faults in the unit. Signals from the digital logic are applied to compensation summer 21 through sample and hold circuits 23 and to output amplifier 22.

The vibratory sensing element or tuning fork 11 is used as the clock reference for the digital logic, with clock signals derived from the drive circuit or oscillator 28 being applied to the digital logic through a clock filter 29. This reduces the size and cost of the rate sensor by eliminating the need for an external clock and thereby reducing the overall part count and circuit board area. It also simplifies the task of fault detection since monitoring tuning fork integrity automatically monitors the integrity of the clock signal. In addition, the clock signal is synchronous with the output signal, and there can be no aliased signals or beat tones at sum and difference frequencies.

In the preferred embodiment, the fundamental frequency of the tuning fork is used as the clock reference for the digital logic. Alternatively, a phase-locked loop can be utilized to generate a multiple of the fork drive frequency for faster signal processing. In either case, the frequency determining element is the same tuning fork that serves as the sensing element.

As illustrated in FIG. 2, the drive circuit or oscillator 28 comprises a loop which is sometimes referred to as an AGC (automatic gain control) servo loop. When the drive tines are oscillating, a current is generated across the drive electrodes. This current is passed through a current-to-voltage amplifier 31 to produce a voltage which is applied to the input of a demodulator 32. That voltage is sometimes referred to as the IX signal. A voltage comparator 33 connected to the output of the current-to-voltage amplifier produces a square wave at the drive frequency. This square wave is applied to the control input of the demodulator, and with the demodulator operating at the drive frequency, its output includes a term at dc.

The dc term from the demodulator is applied to a summing circuit 34 where it is combined with a fixed scale factor reference voltage 36 and a programmable scale factor reference voltage 37. The output of the summing circuit is connected to the input of an integrator 38.

The output of the integrator will move either toward a more positive voltage or toward a more negative voltage if its input is non-zero. This means that in a steady state condition, the input to the integrator must, on average, be zero. Thus, the output of the demodulator must exactly cancel the sum of the two scale factor reference voltages. Since the output voltage of the demodulator represents the amplitude of oscillation of the drive mode of the tuning fork, the two scale factor reference voltages set the magnitude of the drive mode oscillation.

The rate sensing capability of the tuning fork depends on the Coriolis force which couples input rotation about the axis of symmetry of the drive tines to an out-of-plane torsional mode. The Coriolis force is proportional to the product of the rate of rotation and the velocity of the tines, and that velocity is proportional to the amplitude of the tine oscillation. Thus, as the tines are driven to oscillate with a greater amplitude of displacement and velocity, the response to rotation via the Coriolis force will be proportionally greater. Thus, the scale factor, or response per unit rotation of the tuning fork, increases proportionally with the drive amplitude.

In determining the amplitude of oscillation of the drive mode of the tuning fork, scale factor reference voltages 36, 37 also determine the scale factor of the device. The fixed voltage is used to set the nominal scale factor, and the programmable voltage is used for fine adjustment. This permits the scale factor of each unit to be corrected for minor variations in individual tuning fork characteristics so that each rate sensor produced can have the proper scale factor output.

The programmable data for setting the programmable scale factor reference voltage is derived from a digital coefficient stored in EEPROM 26 and accessed by digital logic 24. That data is converted to an analog voltage which is applied to the programmable bias voltage input of summing circuit 34. In one presently preferred embodiment, the range of adjustment of the programmable component of the scale factor reference is on the order of ±35 percent of the fixed component.

The voltage level at the output of integrator 38 is monitored by a window comparator 39 which detects unacceptable conditions or failures in the drive loop. The window comparator comprises a pair of comparators 41, 42 and an inverting OR gate 43, with the outputs of the comparators being connected to the inputs of the inverting OR gate. The upper and lower voltage limits are set by reference voltages +REF and −REF which define the trip points of the circuit. The other two comparator inputs are connected together for receiving the signal from the integrator. The output of the inverting OR gate is passed through a low pass filter 44 and monitored by the built-in test logic.

As long as the output of the integrator is within the limits set by reference voltages, the output of the window comparator will be determined to be acceptable by the built-in test logic 46. If at any time the output of the integrator should fall outside these limits, the test logic will detect a failure and trigger output stage 22 to shift rapidly to the positive voltage rail, which is interpreted as a failure condition.

The types of failures which can be detected within the oscillator loop include a defective or broken tuning fork, an open electrical trace leading to or from the fork, a change in the fork mode "Q" factor caused by a leak in the backfill gas of the package in which the tuning fork is encapsulated, and a shorted or open feedback component across the integrator.

To permit failures of the integrator to be detected by the built-in test logic, the output of the integrator is combined with a bias voltage 48 in a summing circuit 49 to move the steady state output of the integrator away from virtual ground, i.e. the midpoint between the positive and negative supply voltages, to a desired value. This is necessary because if the feedback path across the integrator becomes shorted, the output of the integrator will remain at virtual ground, i.e. +2.5 volts for a system with supply voltages of +5 volts and 0 volts. In order to detect this failure, the acceptable range of integrator output voltages must be biased away from virtual ground, typically to a range of about +2.6 volts to +4.0 volts for normal operating conditions.

If the feedback path across the integrator becomes open, the integrator amplifier will pass all the double frequency components created by the demodulator. This double-frequency signal, when passed through the window comparator, will result in a stream of digital "ones" and "zeros" as the amplifier output transitions through the trip limits. Low pass filter 44 reduces this pulse stream to a dc voltage which is detected by the built-in test logic as a failure.

The output of summing circuit 49 is amplified by an amplifier 51 and applied to an amplitude modulator 52 to modulate the output voltage from voltage comparator 33. The output of the voltage comparator is a rail-to-rail square wave, and the modulator adjusts the peak-to-peak amplitude of that square wave to provide a variable drive voltage for the drive tines of the tuning fork.

The square wave from the modulator is applied to the drive tines through a multiplexer 53 which is controlled by a signal from the logic circuitry. It is also applied to the input of a bandpass filter 54 with a gain of 1.0 at its center frequency which is approximately equal to the natural frequency of the drive mode of the tuning fork. This filter significantly attenuates the harmonic content of the square wave, and produces another drive signal which is nearly a pure sine wave. That signal is applied to a second input of the multiplexer.

The peak-to-peak voltage of the square wave drive signal rises more rapidly and results in a faster turn-on than the sine wave, and is applied to the drive tines during the initial phase of turn-on to minimize turn-on time. Once the amplitude of the tuning fork oscillations reaches a level such that the output of integrator 38 exceeds the lower control limit of window comparator 39, the built-in test logic generates a command signal to the multiplexer to switch its output from the square wave to the sine wave. The relatively harmonic-free sine wave is then used to drive the tuning fork for the remainder of its operation until the next turn-on sequence.

This provides the advantages of both types of drive signals without the disadvantages of either. The square wave provides more rapid onset of fork oscillation and stabilization at the amplitude control level. However, it also has a high harmonic content which can, in some instances, couple to higher order modes of the tuning fork structure and cause undesired bias shifts in the sensor output. The sine wave is relatively free of such harmonics, but it rises more slowly and results in a slower turn-on than the square wave, and therefore is not as good for start-up operation.

It is important for the clock reference to be generated in such a way that it has a fixed phase relationship with respect to the phase of the tuning fork motion. If that phase relationship were to vary from one turn-on to the next, the logic would still function properly, but the difference in phase would likely result in differences in the bias offset of the sensor due to finite coupling of the clock signal into the output signal path. A fixed clock phase relationship ensures that if this coupling exists, it will have a fixed value from turn-on to turn-on.

The fixed phase relationship is provided by the clock filter 29 through which the clock signals are applied to the logic circuitry. As illustrated in FIG. 3, the clock filter comprises a pair of D-type flip-flops 56, 57 that are reset simultaneously to clear their outputs, designated QA and QB, respectively. These flip-flops trigger on positive-going clock edges, and the input clock signal is derived from the output of voltage comparator 33, with non-inverted clock input signal being applied to flip-flop 56 and the inverted clock input signal being applied to flip-flop 57 through an inverter 58.

A feedback loop comprising an integrator 59, a Schmitt trigger 60 and an inverter 61 is connected between the Q output and the D input of flip-flop 57. This causes clock input to be divided by 2 so that the signal QB at the output of flip-flop 57 is a square wave with a frequency equal to exactly one half that of the clock input.

Flip-flop 56 is slaved to flip-flop 57, with the delayed QB output signal from flip-flop 57 being applied to the D input of flip-flop 56 through an inverter 62. Thus, the signal QA at the output of flip-flop 56 is also a square wave with a frequency equal to exactly one half that of the clock input, and the outputs of the two flip-flops are always out-of-phase with each other by one-half of the input clock cycle.

The integrator and Schmitt trigger introduce a delay into the feedback which prevents multiple transitions from occurring in the clock output signal in the event that such transitions are present in the input clock signal. The delay prevents the flip-flops from making additional transitions for a fixed period of time after an initial transition at a first positive-going clock edge. This delay is illustrated in FIG. 4, and is on the order of 10 to 25 percent of the clock period. Inhibiting the flip-flops in this manner provides a clean output signal from a clock input which may contain multiple transitions within a short period after an initial transition. Such transitions can, for example, arise from an element such as a comparator which is utilized in the generation of the clock input, and they can occur throughout the operation of the sensor, not just at start-up.

The outputs QA and QB of flip-flops 56, 57, which are free of spurious transitions, are input to an exclusive-OR gate 63. Since these two signals are both at one-half the frequency of the clock input signal, they combine to produce a new clock signal at the same frequency as the clock input signal. Since the two flip-flops are slaved together and their QA and QB outputs are always out-of-phase with each other by one-half of the input clock cycle, the phase of the output clock signal from the filter always has a fixed relationship with respect to the clock signal input to the filter. This phase relationship is illustrated in FIG. 4.

FIG. 5 illustrates a reset circuit 64 which prevents an incorrect clock signal from being derived from a spurious oscillation occurring between the moment that power is applied to the sensor and the onset of sufficient fork drive oscillation. This circuit includes a precision oscillator 66 comprising a voltage comparator 67 with a resistor 68 and a capacitor 69 which determine the frequency of the oscillator. This frequency is significantly lower than the system clock frequency, and in one presently preferred embodiment, the system clock has a frequency of 10 KHz, and oscillator 66 operates at a frequency of 1 Khz.

As illustrated in FIG. 6, a finite time is required for the drive oscillator signal 71 to transition from some indeterminate frequency to its normal operating frequency. Waveform 72 illustrates the gradual rise in input voltage as the power is applied. When the input voltage reaches a threshold level, typically about 3.8 volts, a power-on reset pulse 73 is generated to provide the initial reset for the logic circuits.

The output of oscillator 66 is connected to the input of a 9-bit (divide-by-512) counter 74. The output of this counter is fed to control logic 77 which also receives an asynchronous reset signal from power-on reset circuit 78. Upon receipt of the signal from counter 74, the control logic toggles a comparator enable signal 79 to shut off voltage comparator 67, which then ceases to oscillate until another power-on reset occurs. The control logic also enables a reset pulse synchronizer 81 which delivers a synchronous reset signal that is synchronized with the clock signal from clock filter 29 which is known to be valid. The synchronous reset signal is combined with the asynchronous reset signal in an OR gate 82 to provide the system reset signal 83. As illustrated in FIG. 6, this signal transitions to a low state and then back to a high state in synchronization with the main system clock. Delaying delivery of the reset signal in this manner ensures that a final reset is given to all digital logic circuits after a clock which is known to be valid is derived from the tuning fork.

The control logic performs its function within two cycles of the signal from oscillator 66, yielding a total of 514 cycles for the operation of that oscillator, at which point it is fully disabled.

The lower two waveforms show the system clock and the system reset signal on an expanded scale. As illustrated by these two waveforms, the negative-going transition of the system reset signal can be asynchronous to the system clock, and can occur several clock cycles prior to the positive-going transition, but the positive-going transition is synchronized to the system clock.

This reset circuit initializes the digital logic when power is applied to the sensor. Until that timing sequence is complete, the built-in test logic holds the signal from output stage 22 at the positive rail voltage. Thereafter, the output is allowed to assume the value corresponding to the rate of rotation of the sensor. When the output comes off the rail, it serves as an indication that the sensor is ready to use and will give valid data. The output will then return to the positive rail only if a failure is detected.

When a failure is detected and the output moves to the positive voltage rail, a BIT flag is latched and remains latched until another power turn-on sequence occurs. However, this latching of the BIT flag is inhibited prior to the completion of the turn-on sequence so that the transient conditions during start-up will not leave the BIT flag latched.

If the power applied to the unit should ever drop below the threshold of the power-on reset circuit, that circuit will automatically be re-triggered. That re-triggering provides an indication that a loss of power has occurred.

As illustrated in FIGS. 1 and 7, the system includes a built-in temperature sensor 86 which provides an analog signal that is converted to digital form in an analog-to-digital converter (ADC) 87 comprising a voltage comparator 88. The analog temperature signal is combined with a reference voltage at a summing junction 89 so that it will be at mid-scale in the ADC at room temperature (300° K.). The adjusted temperature signal from the summing junction is passed through an amplifier 91 and applied to the input of voltage comparator 88. The output of the comparator is high for signals above virtual ground and low for signals below virtual ground.

The signal from comparator 88 is applied to successive approximation logic 92 which provides an 8-bit digital word corresponding to temperature. That signal is applied to a digital-to-analog converter (DAC) 93, the output of which is connected to one of the sample and hold circuits 23. The output voltage from the sample and hold circuit is applied to summing junction 89 as a feedback signal. With successive cycles of the successive approximation logic, the feedback voltage approaches a level equal to the sum of the other two input voltages, reaching a level quite close to that sum in the eighth cycle.

The output of the successive approximation logic thus converges on an 8-bit word which corresponds to the analog temperature. The logic circuits convert that word to an EEPROM address which is used in the retrieval of temperature compensation data.

Combining the feedback signal with the temperature sensor signal at summing junction 89 provides a signal corresponding to the residual error from the conversion process. That error should be no more than about one-half of the value of the least significant bit in the 8-bit word.

The residual error signal is monitored by a window comparator 94 to make verify that the error is within acceptable limits. That window comparator is similar to window comparator 39, and it comprises a pair of comparators 96, 97 and an inverting OR gate 98, with the outputs of the comparators being connected to the inputs of the inverting OR gate. The signal from amplifier 91 is applied to one input of each of the comparators. Reference voltages +REF and -REF applied to the comparators set upper and lower reference limits corresponding to range of acceptable residual errors in the A/D conversion process. In the event of a failure in that process, the residual error will exceed the limits set by the reference voltages, and the inverting OR gate will provide an output signal which is high.

After completing the eight cycles of conversion, the successive approximation logic generates an END OF CONVERSION pulse. That pulse and the output signal from the window comparator are applied to an AND gate 99. The output of the AND gate is applied to the built-in test (BIT) logic 46 in digital logic 24. If the output of the window comparator is high when the END OF CONVERSION pulse is generated, the AND gate will deliver a high output pulse which the test logic interprets as a BIT failure. It then delivers a BIT command to output stage 22 to drive the output signal to the positive voltage rail which indicates a failure.

In order to eliminate the possibility of "nuisance" BIT failure commands, the BIT logic looks for eight consecutive conversion failures before generating a BIT failure command. If fewer than eight failed conversions occur, the BIT logic is not triggered, and the previous valid conversion data is left unchanged until another valid conversion is completed. If eight or more successive conversions fail, the BIT command is delivered to indicate that a failure has occurred.

The digital compensation data produced by the A/D conversion is processed by digital logic 24 to locate the appropriate pointer address within EEPROM 26 to access the correct output bias compensation value corresponding to the current temperature. The logic then reads the bias value to use from the EEPROM and updates the compensation at the output of the sensor.

Alternatively, instead of using this look-up table approach, coefficients could be stored within the EEPROM for conversion to compensation values by the use of arithmetic within the logic circuits of the system or by an ancillary processor, with the bias offset being approximated by a polynomial.

The compensation updates occur relatively rapidly, at roughly the drive frequency divided by 80, which generally means that the updates will occur at a rate faster than 120 Hz. This is much faster than any significant change in output bias caused by variations in temperature. For that reason, allowing up to seven failed conversion cycles to occur without updating the output compensation causes no appreciable effect on the accuracy of the output compensation.

Digital-to-analog converter (DAC) 93 is also employed in the conversion of compensation signals from a number of other sources. As illustrated in FIG. 1, the DAC is multiplexed between the different sources by an input multiplexer 101. The output of the DAC is delivered to different ones of the sample and hold circuits 23 by an output multiplexer 102. In the embodiment illustrated, the compensation signals include a constant bias offset reference, the ratiometric bias reference, the ADC successive approximation logic output, and the drive oscillator AGC loop reference which is used to set the system scale factor. The data for all of these references is stored in EEPROM 26 and accessed by digital logic 24. The analog signals from the sample and hold circuits are applied to compensation summer 21, summing junction 34 at the input to the AGC loop integrator, and the summing junction 89 in analog-to-digital converter (ADC) 87.

From the foregoing, it will be noted that digital-to-analog converter (DAC) 93 is an integral element in the analog-to-digital (A/D) conversion process. Hence, by confirming a valid ADC output, the functionality of the DAC is also verified. Thus, the integrity of the other DAC functions is also assured.

Means is also included for verifying the validity of data in EEPROM 26. This is important because the values stored in the EEPROM are used continuously to compensate the output of the sensor in accordance with temperature. Some of the memory locations in the EEPROM are used for storing manufacturing data.

The temperature compensation data is stored at specific address locations in the EEPROM, with the difference in temperature for successive compensation values typically being on the order of about 1° C. As part of validating the compensation data to be retrieved, the logic ensures that the requested address is within the acceptable bounds of the EEPROM address limits and that it is not within the range of addresses reserved for manufacturing data.

At the time of factory calibration, any memory locations which do not correspond to valid calibration data are filled with a digital word corresponding to 8 ones, i.e. 11111111 in binary notation or FF in hexadecimal notation. The logic interprets all ones as illegal data, and if any of the memory locations containing such data are accessed, the logic will automatically flag a BIT failure.

Redundant data storage is employed in order to guard against a failure of the EEPROM memory. The 8-bit binary word for each compensation value is stored in two memory locations, and when data is accessed from the EEPROM, the data from both locations is read and compared to ensure that no corruption of data has occurred.

Valid data is recognized in two ways—identical and complementary. If the two 8-bit words are identical, the compensation value is interpreted by the digital logic as being valid and as having a positive sign. If the two words are complementary, the compensation value is interpreted as being valid and as having a negative sign. This not only checks the integrity of the data, but also provides an extra bit of data precision in the sign bit.

The sign bit is implemented by selecting one of two possible reference voltages for use by the digital-to-analog converter (DAC) in the conversion of the bias compensation values. A positive (greater than virtual ground) DAC reference is used when the sign bit is positive, and a negative (less than virtual ground) DAC reference is used when the sign bit is negative.

A memory definition table is illustrated in FIG. 8. In this table, the two redundant locations for storing each of the compensation values are found in the Primary Byte and Secondary Byte columns. The first row contains a valid pair of data values (11110000B and 11110000B) which are interpreted by the digital logic as a positive number because they are identical. The second row contains a valid pair of data values (11110000B and 00001111B) which are interpreted as a negative number because they are complementary.

The third row contains values (11111111B and 11111111B) which are interpreted as being invalid because they denote memory locations that are not used for compensation data and should not be addressed by the digital logic in proper operation.

The fourth row illustrates an example of data which is invalid because it is corrupt. These two values (11110000B and 11110001B) are neither identical nor complementary, and they are rejected by the digital logic, with a BIT failure being indicated in the output.

Four lines carry signals between digital logic 24 and EEPROM 26. The CS line carries chip select signals which enable data exchange with the EEPROM. The CLK line carries the system clock, and the DIN and DOUT lines carry data in and data out, respectively.

A memory map showing one possible allocation of memory locations within EEPROM 26 is illustrated in FIG. 9. This map shows the allowable addresses partitioned between manufacturing data, fixed values such as scale factor and constant bias, and temperature data for ratiometric bias compensation. Address locations are specified in standard hexadecimal notation, with "XX" referring to arbitrary, unspecified numbers. In this example, scale factor data is stored at 00H–01H, constant bias data is stored at 02h–03H, manufacturing data is stored at 10H–1FH, 20H–2FH and 30H–3FH, and ratiometric bias compensation data is stored at 40H–4FH and 1F0H–1FFH.

In order for EEPROM 26 to have the proper data for a particular sensor, this data must be input to the EEPROM in the factory at the time of calibration. Unlike prior art devices, this does not require additional input/output pins to interface with the logic and/or the EEPROM. Only the +5 volt, ground (0 volts) and rate output pins are required, with all external interfacing being done through the rate output pin or terminal.

FIG. 10 illustrates the manner in which EEPROM 26 is programmed. In order to obtain access to the programming mode at the time of factory calibration, and to prevent access at other times, a special sequence of events is required in order. First, the power line must be raised to a specified level above the normal operating voltage (e.g. to a level between 6.5 and 7.6 volts). This increase is detected by a program detect circuit 103 which comprises a window comparator similar window comparators 39 and 94. In order to prevent an instantaneous power glitch from triggering a programming sequence, the supply voltage must remain between the two reference voltage levels for a minimum number of clock cycles (typically 16), as determined by a digital delay circuit 104, before the programming can be accessed. In order to further prevent accidental entry into the programming mode, the supply voltage is also required to remain between the two reference voltage levels throughout that mode.

At the end of the delay period, a tri-state command is sent to the rate output amplifier 22 to switch that amplifier from normal operation to a tri-state mode which enables bidirectional digital data flow between an external programming computer 105 and digital logic 24 and EEPROM 26.

As a further precaution, a proper authorization code must be sent by the external computer before access to the programming mode is permitted, and an additional authorization code must be supplied to the EEPROM to initiate a read or write sequence. There are three possible interactive modes (temperature read, EEPROM read and EEPROM write), and there is a separate authorization code for each. The first two modes are read only modes in that during temperature read mode, data passes from the sensor to the interrogating computer, and during the EEPROM read mode data passes from the EEPROM to the computer. The third mode is a write mode in which the computer writes data into the EEPROM. Except in the temperature read mode, the data must pass from the digital logic to the EEPROM, and a proper authentication code is required for each operation. In addition to the unique code which the sensor requires, the EEPROM has its own required code which also must be supplied in order to gain access to it.

As illustrated in FIG. 10, logic 24 includes functional mode decode logic 106 and EEPROM I/O logic 107. The programming computer is connected to the rate output pin, and data passes to and from the EEPROM using a standard RS-232 serial protocol.

At the end of the programming sequence, the power line is returned to its normal level, thereby shutting off any further access to the EEPROM from the outside world unless the sequence for entering the programming mode is repeated.

Any unintentional entry into the programming mode is virtually impossible. First, the required increase in input power is very unlikely to occur in normal use. Second, unique digital codes are required in order to access the EEPROM through the rate output pin. Moreover, even if the programming mode were entered by accident, the rate output would undergo a large, rapid shift in voltage which would indicate that a failure has occurred and that the sensor output is no longer valid.

In the event that the data line DOUT between the logic circuits and the EEPROM should become open, a pull-up circuit will cause ones to appear in all eight bits on that line. This FF or 11111111 word is interpreted as invalid data, and the open line is detected as a failure condition.

As illustrated in FIG. 11, output amplifier 22 receives control inputs (labeled A, B and C) from the control logic which determine the mode of operation for the amplifier. A truth table for these modes is provided in FIG. 12. As the two figures illustrate, for normal operation, input A is high while inputs B and C are both low. In this mode, the rate output pin provides valid rotation rate information. When the A, B and C inputs are all high, the BIT mode is flagged, and the output of the stage is pulled to the positive voltage rail. When the B input is high and the A and C inputs are both low, the tri-state programming mode is activated.

The inputs shown in FIG. 11 as coming from preamp A and preamp B come from earlier stages of the output amplifier, and the bias input shown in this figure is a biasing voltage which is applied only to the transistors in this section of the amplifier. The point in the circuit labeled "$V_O$" is the rate output terminal or node.

In a preferred embodiment, the circuitry for the sensor is constructed in integrated form as an application specific integrated circuit (ASIC). The tuning fork and the EEPROM are external to the ASIC, and compensation values can be loaded via computer interface into the EEPROM through the digital logic in the ASIC. In one presently preferred embodiment, the ASIC has only three connector terminals: +5 volts, ground (0 volts), and the output signal.

As illustrated in FIG. 1, proper operation of the sensor is further ensured by coupling an attenuated version of the fork drive signal to the pickup tines and monitoring the response of stages in the rate signal path to that signal. In that regard, the low level IX signal from current-to-voltage converter 31 is added to the virtual ground voltage at a summing node 109 and coupled to the pickup tines. The extra fork output produced by this signal acts as a large ac bias prior to demodulator 18 and as a large dc bias following the demodulator. This bias passes through low pass filter and is then cancelled by a cancellation term in cancellation circuit 20.

If the tuning fork and the elements in the rate signal path are functioning properly, the cancellation term will exactly cancel the bias at the output of the low pass filter. If any of those elements should fail, the bias at the output of the filter will not be equal and opposite to the cancellation term, and a shift in the output will occur. That shift is interpreted as a BIT failure. This method of detecting failures in the rate signal path is described in greater detail in U.S. Pat. No. 5,426,970.

The invention has a number of important features and advantages. All of the functional aspects of the sensor are continuously monitored to ensure that the output data is valid. This is of paramount importance where the rate sensor is used for safety applications, as in the stabilization of automobiles, e.g. anti-skid systems. By using only the rate output pin for bidirectional data flow, the need for additional lines for external programming is avoided. Access to the programming mode is limited, and accidental entry into that mode is virtually impossible. The use of the rate output pin to signal failures avoids the need to use and additional line or pin for that purpose.

It is apparent from the foregoing that a new and improved inertial rate sensor and method have been provided. While only certain presently preferred embodiments have been described in detail, as will be apparent to those familiar with the art, certain changes and modifications can be made without departing from the scope of the invention as defined by the following claims.

What is claimed is:

1. In an inertial rate sensor: a vibratory rate sensing element, a drive circuit for applying a drive signal to the rate sensing element, an output terminal, a pickup circuit coupled to the rate sensing element for providing a rate output signal at the output terminal corresponding to movement of the rate sensing element, a memory in which compensation values are stored in the form of digital data, means for communicating with an external programming computer through the output terminal to access data stored in the memory, a digital-to-analog converter for converting data retrieved from the memory to analog signals, means for calibrating the rate sensor with the analog signals, means for monitoring conditions at different points within the rate sensor to detect occurrence of a failure, and means for applying a signal of predetermined character to the output terminal in the event that occurrence of a failure is detected.

2. The inertial rate sensor of claim 1 including an output stage which can be selectively programmed for operation in a normal mode in which the rate output signal is passed to the output terminal, a failure mode in which the output terminal is held at a predetermined voltage to indicate the occurrence of a failure, and a programming mode in which data can pass bidirectionally through the output terminal.

3. The inertial rate sensor of claim 1 including a temperature sensor for providing an analog temperature signal, means including an analog-to-digital converter and successive approximation logic for converting the analog temperature signal to a digital signal for use in addressing the memory to retrieve temperature compensation data.

4. The inertial rate sensor of claim 1 including a temperature sensor for providing an analog temperature signal, means including an analog-to-digital converter and successive approximation logic for converting the analog temperature signal to a digital temperature signal, means for applying the digital temperature signal to the digital-to-analog converter to provide an analog feedback signal, means for combining the feedback signal with the signal from the temperature sensor to provide a residual error signal, and means for monitoring the residual error signal to verify the accuracy of the conversions.

5. The inertial rate sensor of claim 3 wherein the means for monitoring includes a window comparator for monitoring a signal in the analog-to-digital converter in order to detect a failure in either the analog-to-digital converter or the digital-to-analog converter.

6. The inertial rate sensor of claim 1 including means for permitting entry into a programming mode only when the following conditions have all been met: power supply voltage is raised to an elevated level and maintained at the elevated level for a predetermined period of time, a first access code is applied through the output terminal, and a second access code is applied to the memory to initiate a read/write sequence.

7. The inertial rate sensor of claim 1 wherein the data is stored in the memory in the form of digital words each of which is stored in two different memory locations, together with means for reading the data from both locations and comparing the two words to determine whether any corruption of data has occurred.

8. The inertial rate sensor of claim 7 wherein the means for comparing the two words interprets the data as having a positive sign if the two words are identical and as having a negative sign if the two words are complementary.

9. In a method of sensing inertial rate, the steps of: applying a drive signal to a vibratory element in a rate sensor to produce oscillation, monitoring signals produced by movement of the vibratory element to provide a rate signal, delivering the rate signal to an output terminal, storing compensation values in a memory in the form of digital data, communicating with an external programming computer through the output terminal to access data stored in the memory, converting data retrieved from the memory to analog signals, calibrating the rate sensor with the analog signals, monitoring conditions at different points within the rate sensor to detect occurrence of a failure, and applying a signal of predetermined character to the output terminal in the event that occurrence of a failure is detected.

10. The method of claim 9 including the steps of selectively programming an output stage for operation in a normal mode in which the rate output signal is passed to the output terminal, a failure mode in which the output terminal is held at a predetermined voltage to indicate the occurrence of a failure, and a programming mode in which data can pass bidirectionally through the output terminal.

11. The method of claim 9 including the steps of providing an analog temperature signal, converting the analog temperature signal to a digital signal in an analog-to-digital converter and successive approximation logic, and addressing the memory in accordance with the digital signal to retrieve temperature compensation data.

12. The method of claim 9 including a the steps of providing an analog temperature signal, converting the analog temperature signal to a digital signal in an analog-to-digital converter and successive approximation logic, applying the digital temperature signal to an digital-to-analog converter to provide an analog feedback signal, combining the feedback signal with the signal from the temperature sensor to provide a residual error signal, and monitoring the residual error signal to verify the accuracy of the conversions.

13. The method of claim 12 wherein the residual error signal is monitored with a window comparator in order to verify that any conversion error is within predetermined limits.

14. The method of claim 9 including the steps of checking for the following conditions before permitting entry into a programming mode: power supply voltage is raised to an elevated level and maintained at the elevated level for a predetermined period of time, a first access code is applied through the output terminal, and a second access code is applied to the memory to initiate a read/write sequence.

15. The method of claim 9 wherein the data is stored in the memory in the form of digital words, and including the steps of storing each of the digital words in two different memory locations, reading the words from the two locations, and comparing the data from the two locations to determine whether any corruption of data has occurred.

16. The method of claim 15 wherein the data is interpreted as having a positive sign if the two words are identical and as having a negative sign if the two words are complementary.

17. In an inertial rate sensor: a vibratory rate sensing element, a drive circuit for applying a drive signal to the rate sensing element, an output terminal, a pickup circuit coupled to the rate sensing element for providing a rate signal corresponding to movement of the rate sensing element, a memory in which digital data is stored, an output stage capable of operating in a normal mode in which the rate signal is passed to the output terminal and in a programming mode in which an external computer can interface with the memory through the output terminal, and means for preventing the output stage from entering the programming mode unless the following conditions are met: the power supply voltage is raised to an elevated level and maintained at the elevated level for a predetermined period of time, a first access code is applied through the output terminal, and a second access code is applied to the memory to initiate a read/write sequence.

18. In an inertial rate sensor: a vibratory rate sensing element, a drive circuit for applying a drive signal to the rate sensing element, an output terminal, a pickup circuit coupled to the rate sensing element for providing a rate signal corresponding to movement of the rate sensing element, a memory in which digital data is stored, means for monitoring conditions within the rate sensor to detect occurrence of a failure in the rate sensor, and an output stage capable of operating in a normal mode in which the rate signal is passed to the output terminal, a programming mode in which an external computer can interface with the memory through the output terminal, and a failure mode in which the output terminal is held at a predetermined voltage level in the event that occurrence of a failure is detected.

19. In a method of sensing inertial rate, the steps of: applying a drive signal to a vibratory element in a rate sensor to produce oscillation, monitoring signals produced by movement of the vibratory element to provide a rate signal, storing digital data in a memory, programming an output stage for operation either in a normal mode in which the rate signal is passed to an output terminal or in a programming mode in which an external computer can interface with the memory through the output terminal, with the output stage being permitted to enter the programming mode only if the following conditions are met: power supply voltage is raised to an elevated level and maintained at the elevated level for a predetermined period of time, a first access code is applied through the output terminal, and a second access code is applied to the memory to initiate a read/write sequence.

20. In a method of sensing inertial rate, the steps of: applying a drive signal to a vibratory element in a rate sensor to produce oscillation, monitoring signals produced by movement of the vibratory element to provide a rate signal, storing digital data in a memory, monitoring signals to detect occurrence of a failure in the rate sensor, and programming an output stage to operate in a normal mode in which the rate signal is passed to an output terminal, a programming mode in which an external computer can interface with the memory through the output terminal, or a failure mode in which the output terminal is held at a predetermined voltage level in the event that a failure is detected.

21. In an inertial rate sensor: a vibratory rate sensing element, a drive circuit for applying a drive signal to the rate sensing element, a pickup circuit coupled to the rate sensing element for providing a rate signal corresponding to movement of the rate sensing element, a memory in which compensation data is stored in the form of digital words each of which is stored in two different locations, means for reading the data from both locations and comparing the two words to verify the data, means for interpreting the data as having a positive sign if the two words are identical and as having a negative sign if the two words are complementary, means for selecting a compensation value in accordance with the sign of the data, and means for combining the compensation value with the rate signal.

22. In a method of sensing inertial rate, the steps of: applying a drive signal to a vibratory rate sensing element to produce oscillation, monitoring signals produced by movement of the rate sensing element to provide a rate signal, storing compensation data in a memory in the form of digital words each of which is stored in two different locations, reading the data from both locations and comparing the two words to verify the data, interpreting the data as having a positive sign if the two words are identical and as having a negative sign if the two words are complementary, selecting a compensation value in accordance with the sign of the data, and combining the compensation value with the rate signal.

23. In an inertial rate sensor: a vibratory rate sensing element, a drive circuit for applying a drive signal to the rate sensing element, a pickup circuit coupled to the rate sensing element for providing a rate signal corresponding to movement of the rate sensing element, a memory in which compensation values are stored in the form of digital data, means for converting data retrieved from the memory to analog compensation signals, means for adjusting the rate signal in accordance with the compensation signals, a temperature sensor for providing an analog temperature signal, means including an analog-to-digital converter and successive approximation logic for converting the analog temperature signal to a digital signal for use in addressing the memory to retrieve temperature compensation data.

24. In a method of sensing inertial rate, the steps of: applying a drive signal to a vibratory rate sensing element to produce oscillation, monitoring signals produced by movement of the rate sensing element to provide a rate signal, storing compensation values in a memory in the form of digital data, converting data retrieved from the memory to analog compensation signals, adjusting the rate signal in accordance with the compensation signals, monitoring temperature with an analog temperature sensor, converting an analog temperature signal to a digital signal, and addressing the memory in accordance with the digital signal to retrieve temperature compensation data.

25. In an inertial rate sensor: a vibratory rate sensing element, a drive circuit for applying a drive signal to the rate sensing element, a pickup circuit coupled to the rate sensing element for providing a rate signal corresponding to movement of the rate sensing element, a temperature sensor for providing an analog temperature signal, means including an analog-to-digital converter and successive approximation logic for converting the analog temperature signal to a digital temperature signal, a digital-to-analog converter for converting the digital temperature signal to an analog feedback signal, means for combining the feedback signal with the signal from the temperature sensor to provide a residual error signal, and means for monitoring the residual error signal to verify the accuracy of the conversions.

26. In a method of sensing inertial rate, the steps of: applying a drive signal to a vibratory rate sensing element to produce oscillation, monitoring signals produced by movement of the rate sensing element to provide a rate signal, monitoring temperature with an analog temperature sensor, converting an analog temperature signal to a digital temperature signal, converting the digital temperature signal to an analog feedback signal, combining the feedback signal with the signal from the temperature sensor to provide a residual error signal, and monitoring the residual error signal to verify the accuracy of the conversions.

* * * * *